United States Patent
Liu et al.

(10) Patent No.: US 11,836,286 B2
(45) Date of Patent: Dec. 5, 2023

(54) HEAD-MOUNTED DISPLAY DEVICE AND DATA ACQUISITION METHOD, APPARATUS, AND HOST COMPUTER THEREOF

(71) Applicant: GOERTEK INC., Weifang (CN)

(72) Inventors: Xin Liu, Weifang (CN); Bin Jiang, Weifang (CN); Xiaoyu Chi, Weifang (CN)

(73) Assignee: GOERTEK INC., Shandong (CN)

( * ) Notice: Subject to any disclaimer, the term of this patent is extended or adjusted under 35 U.S.C. 154(b) by 0 days.

(21) Appl. No.: 18/011,004

(22) PCT Filed: Nov. 25, 2020

(86) PCT No.: PCT/CN2020/131295
§ 371 (c)(1),
(2) Date: Dec. 16, 2022

(87) PCT Pub. No.: WO2022/099787
PCT Pub. Date: May 19, 2022

(65) Prior Publication Data
US 2023/0236663 A1 Jul. 27, 2023

(30) Foreign Application Priority Data
Nov. 13, 2020 (CN) .......................... 202011268687.9

(51) Int. Cl.
G06F 3/01 (2006.01)
G06F 3/14 (2006.01)
(52) U.S. Cl.
CPC ................ G06F 3/012 (2013.01); G06F 3/14 (2013.01)
(58) Field of Classification Search
CPC . G06F 3/012; G06F 3/14; G06F 3/011; H04N 13/344; G02B 27/017; G02B 27/0172
See application file for complete search history.

(56) References Cited

U.S. PATENT DOCUMENTS

2017/0160795 A1 6/2017 Hu
2017/0278262 A1* 9/2017 Kawamoto ............. H04N 5/64
(Continued)

FOREIGN PATENT DOCUMENTS

CN 105976424 9/2016
CN 106919360 7/2017
(Continued)

OTHER PUBLICATIONS

International Search Report for International Application No. PCT/CN2020/131295, dated Aug. 12, 2021, 9 pages.

*Primary Examiner* — Md Saiful A Siddiqui
(74) *Attorney, Agent, or Firm* — HAUPTMAN HAM, LLP (57) ABSTRACT

A data acquisition method and apparatus for a head-mounted display device, a host and a head-mounted display device are provided. The method includes: acquiring user head posture information collected by a head posture sensor; determining a predicted head position at a next rendering moment based on the user head posture information and a current display scene of the head-mounted display device; and acquiring a current video rendering corresponding to the current rendering moment based on the predicted head position and video data at the current rendering moment, in order that the head-mounted display device displays a rendered video at the current rendering moment and a target time warped frame, where the current video rendering includes the rendered video and one or more time warped frames for the next rendering moment, and the target time warped frame is one of the one or more time warped frames.

10 Claims, 6 Drawing Sheets

(56) References Cited

U.S. PATENT DOCUMENTS

| | | | |
|---|---|---|---|
| 2018/0146189 A1* | 5/2018 | Park | .................... H04N 13/344 |
| 2020/0050264 A1* | 2/2020 | Kruzel | .................... G06T 11/00 |
| 2020/0105050 A1 | 4/2020 | Fan et al. | |
| 2020/0236489 A1* | 7/2020 | Merimaa | ................ H04R 5/033 |
| 2020/0279533 A1 | 9/2020 | Fan et al. | |
| 2021/0173474 A1* | 6/2021 | Sztuk | .................... G06T 19/006 |
| 2021/0240257 A1* | 8/2021 | Mironov | .................. G06F 3/14 |

FOREIGN PATENT DOCUMENTS

| | | |
|---|---|---|
| CN | 107943287 | 4/2018 |
| CN | 109242944 | 1/2019 |
| CN | 109712224 | 5/2019 |
| CN | 109920040 | 6/2019 |
| CN | 110244840 | 9/2019 |
| CN | 111194561 | 5/2020 |
| WO | 2017147178 | 8/2017 |

* cited by examiner

HEAD-MOUNTED DISPLAY DEVICE AND DATA ACQUISITION METHOD, APPARATUS, AND HOST COMPUTER THEREOF

The present application is a 371 of International Patent Application No. PCT/CN2020/131295, titled "HEAD-MOUNTED DISPLAY DEVICE AND DATA ACQUISITION METHOD, APPARATUS, AND HOST COMPUTER THEREOF", filed on Nov. 25, 2020, which claims the benefit of and priority to Chinese Patent Application No. 202011268687.9, titled "HEAD-MOUNTED DISPLAY DEVICE AND DATA ACQUISITION METHOD, APPARATUS, AND HOST COMPUTER THEREOF", filed with the China National Intellectual Property Administration on Nov. 13, 2020, both of which are incorporated herein by reference in their entireties.

FIELD

The present application relates to the field of head-mounted display devices, and in particular, to a data acquisition method and apparatus for a head-mounted display device, a host and a head-mounted display device.

BACKGROUND

With the development of technology in modern society, head-mounted display devices (HMD) such as VR (Virtual Reality) devices, AR (Augmented Reality) devices and MR (Mediated Reality) devices are more and more widely applied. Although the display scene of the head-mounted display devices has become more and more abundant with the development of the head-mounted display devices, even the most sophisticated head-mounted display devices have a fatal flaw: causing strong dizziness. For example, many experiencers of the VR devices have stated that, after using the VR devices for a period of time, they experienced discomfort, nausea, and even vomiting. This flaw has become the greatest obstacle in the development of the head-mounted display devices such as VR devices.

The dizziness experienced when using the head-mounted display devices is caused by the asynchrony between the sense of motion by the eyes and the perception of motion by the brain. Specifically, a display screen (such as a VR display screen) seen by eyes does not match information received from ears (real position), resulting in an increased burden on the brain and causing dizziness (the vestibular organ and the cochlea of the inner ear are collectively referred to as the vestibulocochlear organ, which functions to sense both position and voices. Therefore, it is usually said that the ear can not only hear but also balance, and the balance depends on the vestibular organ. The vestibular organ is a sense organ for sensing a natural motion state and a spatial position of the head). Generally speaking, if a time interval between a moment when movement of a person is detected by the head-mounted display device and a moment when a corresponding screen is displayed on the display screen is greater than 20 ms, the delay of the screen is perceived, resulting in dizziness.

Therefore, it is an urgent problem to be solved currently how to reduce the delay of the display screen perceived by a user of the head-mounted display device, to effectively reduce dizziness of the user, and improve the user experience.

SUMMARY

The present disclosure aims to provide a head-mounted display device, a data acquisition method and apparatus for the head-mounted display device, and a host, so as to reduce the delay of a display screen perceived by a user of the head-mounted display device, thereby effectively reducing dizziness of the user, and improving the user experience.

In order to solve the above technical problem, a data acquisition method for a head-mounted display device is provided according to the present disclosure. The method includes:

acquiring user head posture information collected by a head posture sensor, where the head posture sensor is arranged in the head-mounted display device;

determining a predicted head position at a next rendering moment based on the user head posture information and a current display scene of the head-mounted display device, where the current display scene is a scene displayed by the head-mounted display device at a current rendering moment; and acquiring a current video rendering corresponding to the current rendering moment based on the predicted head position and video data at the current rendering moment, in order that the head-mounted display device displays a rendered video at the current rendering moment and a target time warped frame, where the current video rendering includes the rendered video and one or more time warped frames for the next rendering moment, and the target time warped frame is one of the one or more time warped frames.

In an embodiment, the determining a predicted head position at a next rendering moment based on the user head posture information and a current display scene of the head-mounted display device includes:

determining the predicted head position based on a current user head posture and the current display scene, where the current user head posture is user head posture information at the current rendering moment in the user head posture information.

In an embodiment, the determining a predicted head position at a next rendering moment based on the user head posture information and a current display scene of the head-mounted display device includes:

determining the predicted head position based on a target user head posture and the current display scene, where the target user head posture is user head posture information from a target rendering moment to the current rendering moment in the user head posture information, and the target rendering moment is a predetermined moment prior to the current rendering moment.

In an embodiment, after acquiring current video rendering corresponding to the current rendering moment, the method further includes:

sending, by a host, the current video rendering to the head-mounted display device.

In an embodiment, after determining a predicted head position at a next rendering moment based on the user head posture information and a current display scene of the head-mounted display device, the method further includes:

generating a rendered audio stream for the next rendering moment corresponding to each of the predicted head position, in order that the head-mounted display device plays a target rendered audio stream in the rendered audio stream.

A data acquisition apparatus for a head-mounted display device is further provided according to the present disclosure. The apparatus includes:

an acquisition module, configured to acquire user head posture information collected by a head posture sensor, where the head posture sensor is arranged in the head-mounted display device;

a prediction module, configured to determine a predicted head position at a next rendering moment based on the user head posture information and a current display scene of the head-mounted display device, where the current display scene is a scene displayed by the head-mounted display device at a current rendering moment; and a rendering module, configured to acquire a current video rendering corresponding to the current rendering moment based on the predicted head position and video data at the current rendering moment, in order that the head-mounted display device displays a rendered video at the current rendering moment and a target time warped frame, where the current video rendering includes the rendered video and one or more time warped frames for the next rendering moment, and the target time warped frame is one of the one or more time warped frames.

A host is further provided according to the present disclosure. The host includes:

a memory configured to store computer programs; and a processor, configured to: when executing the computer programs, implement steps of the above data acquisition method for a head-mounted display device.

A data acquisition method for a head-mounted display device is further provided according to the present disclosure. The method includes:

sending, by the head-mounted display device, acquired user head posture information collected by a head posture sensor to a host, where the head posture sensor is arranged in the head-mounted display device;

receiving current video rendering corresponding to a current rendering moment sent by the host, where the current video rendering includes a rendered video at the current rendering moment and one or more time warped frames for a next rendering moment; and displaying, on a display, the rendered video and a target time warped frame in the current video rendering sequentially, where the target time warped frame is one of the one or more time warped frames.

In and embodiment, in a case that a quantity of the one or more time warped frames is greater than 1, the displaying, on a display, the rendered video and a target time warped frame in the current video rendering sequentially includes:

determining a current user head position based on user head posture information at a current moment collected by the head posture sensor, when displaying the rendered video on the display; and selecting, based on a predicted head position corresponding to each of the time warped frames, one of the time warped frames having a corresponding predicted head position that is closest to the current user head position as the target time warped frame, and displaying the target time warped frame after displaying of the rendered video is completed.

In and embodiment, the method further includes:

receiving a rendered audio stream for the next rendering moment sent by the host; and determining a target rendered audio stream in the rendered audio stream based on user head posture information at a current moment collected by the head posture sensor, and playing the target rendered audio stream.

A data acquisition apparatus for a head-mounted display device is further provided according to the present disclosure. The apparatus includes:

a sending module, configured to send acquired user head posture information collected by a head posture sensor to a host, where the head posture sensor is arranged in the head-mounted display device;

a reception module, configured to receive current video rendering corresponding to a current rendering moment sent by the host, where the current video rendering includes a rendered video at the current rendering moment and one or more time warped frames for a next rendering moment; and a display module, configured to display, on a display, the rendered video and a target time warped frame in the current video rendering sequentially, where the target time warped frame is one of the one or more time warped frames.

A head-mounted display device is further provided according to the present disclosure. The head-mounted display device includes:

a memory configured to store computer programs;

a processor, configured to: when executing the computer programs, implement the steps of the above data acquisition method for a head-mounted display device.

A data acquisition method for a head-mounted display device is provided according to the present disclosure. The method includes: acquiring user head posture information collected by a head posture sensor, where the head posture sensor is arranged in the head-mounted display device; determining a predicted head position at a next rendering moment based on the user head posture information and a current display scene of the head-mounted display device, where the current display scene is a scene displayed by the head-mounted display device at a current rendering moment; and acquiring a current video rendering corresponding to the current rendering moment based on the predicted head position and video data at the current rendering moment, in order that the head-mounted display device displays a rendered video at the current rendering moment and a target time warped frame, where the current video rendering includes the rendered video and one or more time warped frames for the next rendering moment, and the target time warped frame is one of the one or more time warped frames.

As can be seen, in the present disclosure, one or more time warped frames for the next rendering moment may be obtained at the current rendering moment by tracking and predicting the motion of user's head at the next rendering moment, in order that the current video data of the head-mounted display device includes time warped frames from the current rendering moment to the next rendering moment, thereby reducing the delay of the display screen perceived by the user of the head-mounted display device, effectively reducing dizziness of the user, and improving the user experience. In addition, a data acquisition apparatus for a head-mounted display device, a host, and a head-mounted display device are further provided according to the present disclosure, which also have the above advantageous effects.

BRIEF DESCRIPTION OF THE DRAWINGS

In order to more clearly illustrate technical solutions in the embodiments of the present disclosure or the conventional technology, the accompanying drawings used in the description of the embodiments or the conventional technology are briefly introduced hereinafter. Apparently, the drawings described hereinafter are only a part of the drawings of the present disclosure. Other drawings may be obtained by those skilled in the art based on the provided drawings without any creative efforts.

DETAILED DESCRIPTION OF THE EMBODIMENTS

The technical solutions in the embodiments of the present disclosure will be described hereinafter with reference to the drawings in the embodiments of the present disclosure. It is apparent that the described embodiments are only a few rather than all of the embodiments according to the present disclosure. Any other embodiments obtained by those skilled in the art based on the embodiments in the present disclosure without any creative work fall in the scope of the present disclosure.

Figure 1:
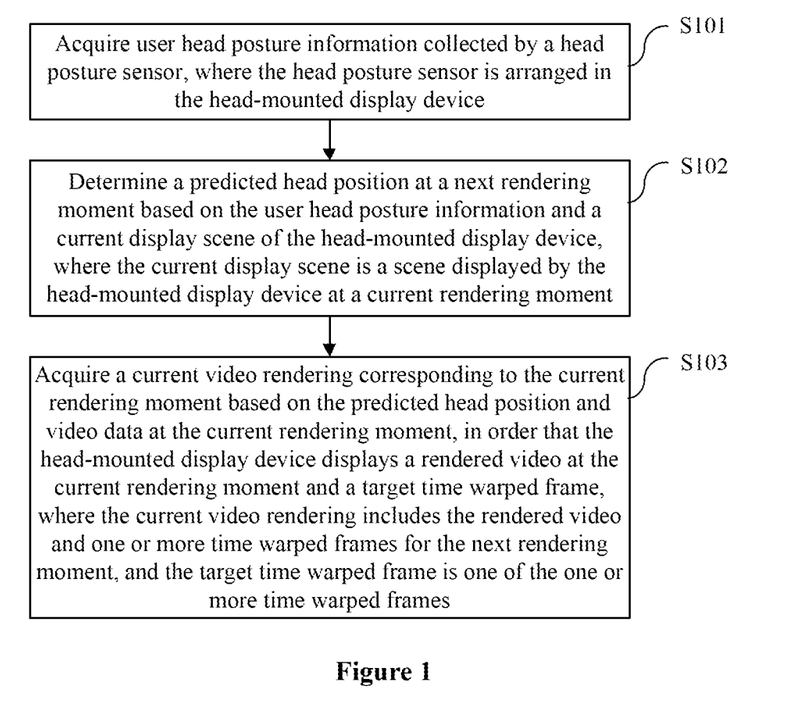
FIG. 1 is a flowchart of a data acquisition method for a head-mounted display device according to an embodiment of the present disclosure.

Reference is made to FIG. 1, which is a flowchart of a data acquisition method for a head-mounted display device according to an embodiment of the present disclosure. The method may include the following steps 101 to 103.

In step 101, user head posture information collected by a head posture sensor is acquired, where the head posture sensor is arranged in a head-mounted display device.

The head posture sensor in this step may be a sensor, such as IMU (Inertial measurement unit), provided in the head-mounted display device (such as a VR device) for collecting data of a position and a posture of the head of a user wearing the head-mounted display device (that is, the user head posture information).

A type of the head posture sensor and a position at which the head posture sensor is arranged on the head-mounted display device in this step may be set by a designer based on application scenes and user requirements. For example, the head posture sensor may be an IMU including an accelerometer (ACC) and a gyroscope (Gyro), or other devices capable of collecting the user head posture information, such as a geomagnetic sensor and a stereo camera. As long as the head posture sensor in the head-mounted display device can collect the data on the position and the posture of the head of the user when the user is wearing and using the head-mounted display device, the type and the position of the head posture sensor are not limited in this embodiment.

Correspondingly, the content of the user head posture information collected by the head posture sensor in this step may be set by the designer. For example, the content may be set in correspondence to the type of the head posture sensor, and is not limited in this embodiment.

Figure 2:
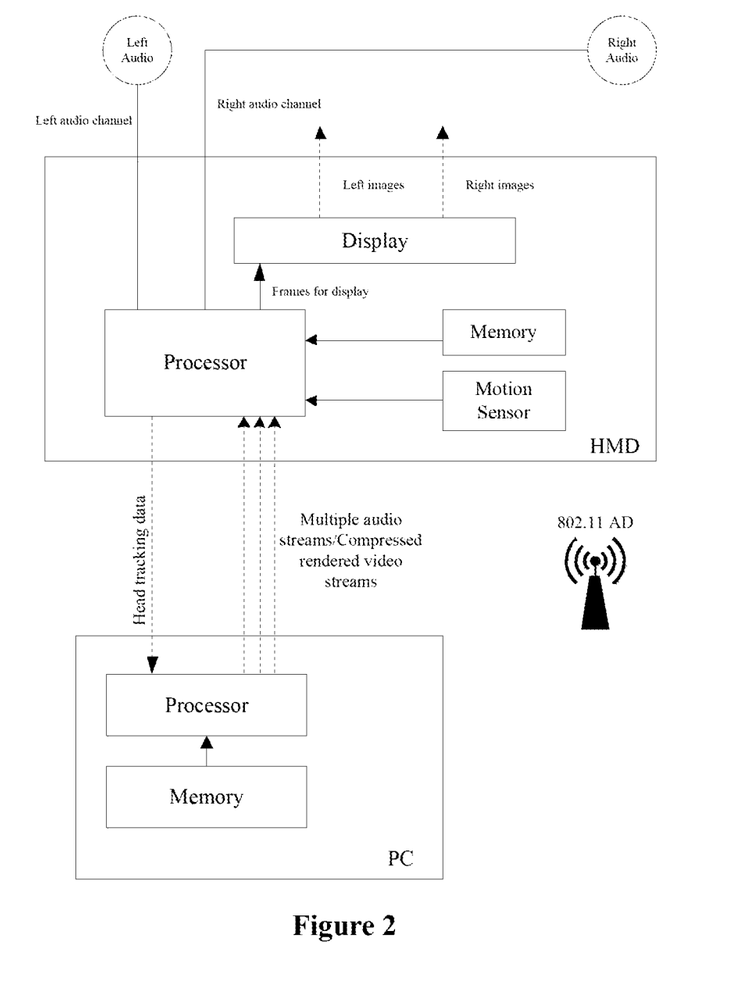
FIG. 2 is a schematic diagram illustrating data transmission of a data acquisition method for a head-mounted display device according to another embodiment of the present disclosure.
Figure 3:
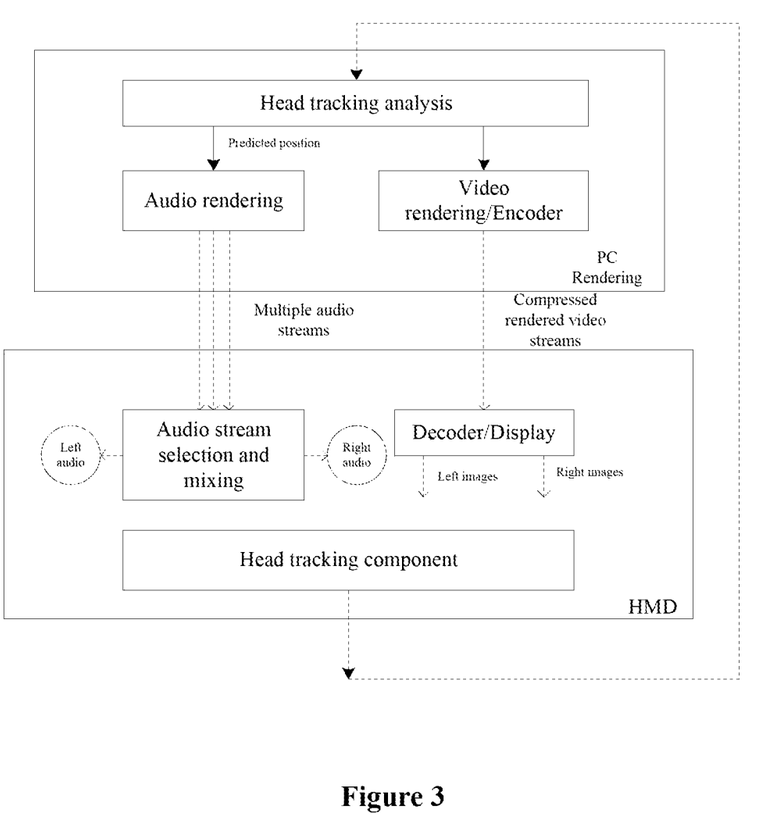
FIG. 3 is a schematic diagram illustrating a principle of transmission of a data acquisition method for a head-mounted display device according to another embodiment of the present disclosure.

It should be understood that the data acquisition method for a head-mounted display device according to the embodiment may be applied to a host, such as a PC (personal computer) or a server in FIG. 2 and FIG. 3, connected to the head-mounted display device. That is, in this embodiment, a processor of the host may predict the user head posture at a next rendering moment based on the user head posture information collected by the head posture sensor in the head-mounted display device, perform rendering and acquire a rendered video, and send the rendered video at a current rendering moment and a time warped frame for the next rendering moment to the head-mounted display device, in order that the head-mounted display device receives the video data ready to display, and display correspondingly, so as to reduce the dizziness of the user. The method according to this embodiment may also be directly applied to a head-mounted display device. That is, a processor of the head-mounted display device in this embodiment may, based on user head posture information collected by its own head posture sensor, predict the user head posture at the next rendering moment, perform rendering and acquire a rendered video at the current rendering moment and the time warped frame for the next rendering moment, so as to display correspondingly, reducing dizziness of the user.

In a case that the method according to this embodiment is applied to the host, in this step, the processor of the host may receive the user head posture information sent by the head-mounted display device. As shown in FIG. 2, the processor of the PC may continuously receive, through a 802.11ad router, the user head posture information (Head tracking data) collected in real-time by the head posture sensor (Motion Sensor) sent by the processor of HMD, so as to track and detect the head position of the user wearing the head-mounted display device.

In step 102, a predicted head position at a next rendering moment is determined based on the user head posture information and a current display scene of the head-mounted display device, where the current display scene is a scene displayed by the head-mounted display device at a current rendering moment.

It should be understood that, in this step, the processor predicts and determines one or more user head positions (i.e. the predicted head position) at the next rendering moment based on the acquired user head posture information and the display scene of the head-mounted display device at the current rendering moment.

In an embodiment, the current rendering moment in this step may correspond to a video frame that is currently to be rendered by the processor, and the next rendering moment may correspond to a next video frame to be rendered by the processor. The current display scene of the head-mounted display device in this step may be a scene displayed by the head-mounted display device corresponding to the current rendering moment, that is, a usage scene (i.e., the display scene) in the head-mounted display device used by the user at the current rendering moment. For example, when a user is experiencing a boxing game using the head-mounted display device, a boxing usage scene is displayed on the head-mounted display device at the current rendering moment. The predicted head position in this step may be one or more positions at which the user's head may be located at the next rendering moment and which are predicted and determined by the processor.

It should be noted that, the manner in which the processor determines the predicted head position at the next rendering moment based on the user head posture information and the current display scene of the head-mounted display device in this step may be determined by a designer based on application scenes and user requirements. For example, the processor may determine the predicted head position at the next rendering moment using a predetermined prediction algorithm based on the user head posture information and the current display scene of the head-mounted display device. That is, the processor may acquire the user head position at a last moment based on the user head posture information at the current rendering moment, and may predict one or more positions (i.e., the predicted head position) where the user's head may be located at the next rendering moment using the Dead Reckoning algorithm, the Kalman filter prediction algorithm and the Alpha-beta-gamma ($\alpha$-$\beta$-$\gamma$) algorithm and other prediction algorithms based on the known user head position at the last moment and the usage scene (that is, the current display scene) that the user uses the head-mounted display device at the current moment. For example, when the user experiences a boxing game with the head-mounted display device, the user doges to the right at the current moment (at this time, an ACC accelerometer in the IMU of the head-mounted display device detects a large value on the positive Y axis, and small values on the X axis and the Z axis, the axis on which the ACC accelerometer has a large value depends on the design, and the above is just an example). In addition to rendering the video at the current rendering moment, the processor may further predict one or more possible user head positions (e.g., right or lower right) based on IMU data at the current rendering moment and the current boxing usage scene of the user by using the algorithm. The processor may further determine a predetermined quantity of predicted head positions with the same distance and in different directions from the user head posture information at the current rendering moment, based on the user head posture information and the current display scene of the head-mounted display device. For example, in a case that the current display scene is a scene in which the user is allowed to move freely, the processor may use six head positions, which are formed by moving the user head position known at the last moment by a predetermined distance forward, backward, to the left, to right, upward and downward, as the predicted head positions, which is not limited in this embodiment.

In an embodiment, the process in which the processor determines the predicted head position at the next rendering moment based on the user head posture information and the current display scene of the head-mounted display device in this step may be set by a designer based on application scenes and user requirements. For example, the processor may determine the predicted head position based on the user head posture information at the current rendering moment (current user head posture) in the user head posture information and the current display scene. That is, the processor may determine the predicted head position based on the user head position known at the last moment and the current display scene. The processor may further determine the predicted head position based on a target user head posture and the current display scene, where the target user head posture is user head posture information from a target rendering moment to the current rendering moment in the user head posture information, and the target rendering moment is a moment prior to the current rendering moment by a predetermined interval. For example, the processor may determine a current head movement trajectory of the user based on the user head posture information from a moment prior to the current rendering moment by 2 s (i.e., the predetermined interval) to the current rendering moment, and determine the predicted head position at the next rendering moment based on the head movement trajectory and the current display scene, which is not limited in this embodiment.

In step 103, a current video rendering corresponding to the current rendering moment is acquired based on the predicted head position and video data at the current rendering moment, in order that the head-mounted display device displays a rendered video at the current rendering moment and a target time warped frame, where the current video rendering includes the rendered video and one or more time warped frames for the next rendering moment, and the target time warped frame is one of the one or more time warped frames.

It should be understood that in this step, the processor acquires the rendered video at the current rendering moment and the time warped frame for the next rendering moment as the current video rendering by rendering the video at the current rendering moment and performing time warping on the video at the current rendering moment based on the predicted head position, in order that the head-mounted display device displays the rendered video at the current rendering moment and the target time warped frame. For example, in a case that the quantity of the predicted head position is 1, the head-mounted display device may sequentially display the rendered video at the current rendering moment, the time warped frame for the next rendering moment (that is, the target time warped frame), and a subsequent rendered video at the next rendering moment. In a case that the quantity of the predicted head position is greater than 1, the head-mounted display device may sequentially display the rendered video at the current rendering moment, the target time warped frame (that is, a selected one of the time warped frames for the next rendering moment) and the subsequent rendered video at the next rendering moment. Thus, the delay of the display screen perceived by the user of the head-mounted display device is reduced by displaying the target time warped frame between the rendered video at the current rendering moment and the rendered video at the next rendering moment.

In an embodiment, the time warped frames for the next rendering moment in this step may be in one-to-one correspondence to the predicted head positions, that is, for each of the predicted head positions, the processor may perform time warping on the video for rendering at the current rendering moment and the predicted head position, to obtain the time warped frame corresponding to the predicted head position. Time warping is a technology for correcting an image frame. When using the head-mounted display device (such as a VR device), the scene rendering may be delayed due to fast head movement, that is, the head has turned, but the image has not been rendered, or a previous image frame is rendered. With the time warping technology, the rendered image is warped before being sent to the display to correct for head motion that occurs after the scene rendering, thus reducing perceived delay.

Correspondingly, the process of the processor performs time warping by using the video for rendering at the current rendering moment and the each of the predicted head positions to obtain the time warped frame for the next rendering moment in this step may be set by a designer. For example, the process may be implemented by using a conventional time warping method or a similar method, which is not limited in this embodiment.

It should be noted that, in this embodiment, the processor may render the video at the current rendering moment by using one thread through a video rendering component, and at the same time perform asynchronous time warp based on the determined predicted head position and the video at the current rendering moment by using another thread, to generate the time warped frame for the next rendering moment. As shown in FIG. 2, the video data (Compressed rendered video streams) sent by the PC to the HMD through the 802.11ad router includes the rendered video at the current rendering moment and the time warped frame for the next rendering moment generated based on the video at the current rendering moment, thereby reducing the video latency perceived by the user. Asynchronous Time Warp refers to processing in another thread (which is referred to as an ATW thread), which runs in parallel (and asynchronously) with the rendering thread. Before each time the synchronic is performed, the ATW thread generates a new frame based on the last frame in the rendering thread, which is much less computationally expensive than rendering an entire new frame for complex scenes.

It should be understood that, because mainstream manufacturers of conventional head-mounted display devices (such as VR devices), whether through hardware, software or a combination of software and hardware, solve the problem of dizziness from the perspective of video transmission and display by improving the refresh frame rate, increasing the resolution, reducing screen deformation, optimizing head movement tracking and optimizing content, which lacks of consideration of audio transmission and playback. The delay of audio transmission and playback also affects the user's hearing and aggravates dizziness of the user. The method according to the embodiment may further include: determining, by the processor, a predicted head position at a next audio rendering moment based on the user head posture information and the current display scene of the head-mounted display device; and generating a rendered audio stream at the next audio rendering moment corresponding to the predicted head position, in order that the head-mounted display device plays a target rendered audio stream in the rendered audio stream, such that the audio at the next audio rendering moment is processed in advance at the current audio rendering moment, which effectively reduce the delay between the position sensed by the eyes and the position perceived by the brain, thereby effectively reducing dizziness.

Correspondingly, the above next audio rendering moment may correspond to the audio data that the processor needs to render next time relative to the current audio rendering moment, and the current audio rendering moment may correspond to the audio data currently to be rendered by the processor.

In an embodiment, time points of the current audio rendering moment and the next rendering moment may be set by a designer. For example, the current audio rendering moment may be the same moment as the current rendering moment. That is, the processor may simultaneously process video and audio by using a thread of a video rendering component and a thread of an audio rendering component. That is, in this embodiment, after the step 102, the method may further include: generating, by the processor, a rendered audio stream for the next rendering moment corresponding to each of the predicted head position, in order that the head-mounted display device plays a target rendered audio stream in the rendered audio stream.

It should be noted that the method according to this embodiment may further include the step of: displaying, by the head-mounted display device on a display, the rendered video and the target time warped frame in the current video rendering sequentially, where the target time warped frame is one of the time warped frames.

According to the embodiment of the present disclosure, the time warped frame for the next rendering moment is obtained at the current rendering moment by predicting the user head motion at the next rendering moment, in order that the current video data of the head-mounted display device can include the time warped frame from the current rendering moment to the next rendering moment, thereby reducing the delay of the display screen perceived by the user of the head-mounted display device, effectively reducing the sense of dizziness of the user, and improving the user experience.

Figure 4:
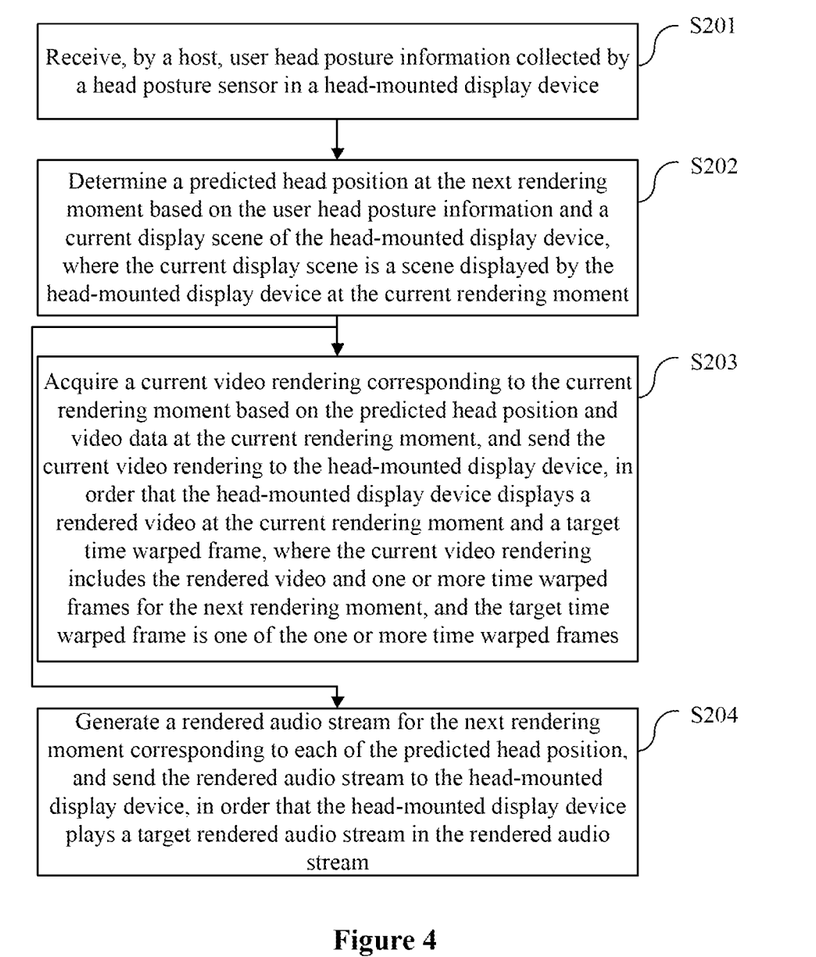
FIG. 4 is a flowchart of a data acquisition method for a head-mounted display device according to another embodiment of the present disclosure.

Reference is made to FIG. 4, which is a flowchart of a data acquisition method for a head-mounted display device according to another embodiment of the present disclosure. The method may include following steps 201 to 204.

In step 201, user head posture information collected by a head posture sensor in a head-mounted display device is received by a host.

It should be understood that, the host in this embodiment may be a device, such as the PC in FIG. 2 or FIG. 3, communicatively connected to the head-mounted display device. As shown in FIG. 3, HMC (head-mounted display device) may send the user head posture information collected by a Head tracking component (namely the head posture sensor) to Rendering (a rendering component, namely the processor) of the PC for Head tracking analysis, to determine a predicted head position at a next rendering moment.

In step 202, the predicted head position at the next rendering moment is determined based on the user head posture information and a current display scene of the head-mounted display device, where the current display scene is a scene displayed by the head-mounted display device at the current rendering moment.

This step is similar to step 102, and is not described in detail here.

In step 203, a current video rendering corresponding to the current rendering moment is acquired based on the predicted head position and video data at the current rendering moment and is sent to the head-mounted display device, in order that the head-mounted display device displays a rendered video at the current rendering moment and a target time warped frame, where the current video rendering includes the rendered video and one or more time warped frames for the next rendering moment, and the target time warped frame is one of the one or more time warped frames.

It should be understood that, in this step, the processor of the host sends the rendered video of the current video rendering obtained by rendering and the time warped frame for the next rendering moment to the head-mounted display device, in order that the head-mounted display device displays the time warped frame for the next rendering moment between displaying the rendered video of the current video rendering and the rendered video of a next video rendering, thereby reducing the video delay perceived by the user.

In an embodiment, as shown in FIG. 2 and FIG. 3, the processor of the host may send data (Compressed rendered video streams) obtained after encoding (Encoder) of the current video rendering corresponding to the current rendering moment to the head-mounted display device through a 802.11ad router.

In step 204, a rendered audio stream for the next rendering moment corresponding to each of the predicted head position is generated and sent to the head-mounted display device, in order that the head-mounted display device plays a target rendered audio stream in the rendered audio stream.

It should be understood that, in this step, the processor may calculate and generate the audio stream (that is, the rendered audio stream) for the next rendering moment corresponding to each predicted head position based on the determined predicted head position at the next rendering moment, and send the generated audio stream to the head-mounted display device, in order that the head-mounted display device may select one audio stream for playback or select multiple audio streams for playback in a combined manner.

In an embodiment, the manner in which the processor generates the rendered audio stream for the next rendering moment corresponding to each predicted head position in this step may be set by a designer. For example, the processor may adjust output sound levels of the left and right channels based on the predicted head position, to obtain the rendered audio stream for the next rendering moment corresponding to each predicted head position, in order that the user of the head-mounted display device can perceive the directionality of the sound. For example, the processor may attenuate or enhance the left or right channel (such as in a level, a frequency, a delay, a reverberation) through an audio rendering component to affect a direction and a distance of the sound perceived by the user. In a case that the predicted head position is located in front of the user, the output sounds of the left and right channels may be rendered to be at the same level, in order that the user perceives that the sound may come from a position in front of the user. In a case that the predicted head position is located to the right of the user, the output sound of the left channel may be rendered to be close to zero and the output sound of the right channel is higher, in order that the user perceives that the sound may come from the right side of the user. In a case that the predicted head position is located on the right side in front of the user, the output sound of the left channel may be rendered to be lower and the output sound of the right channel may be rendered to be higher, in order that the user perceives that the sound may come from a position on the right side in front of the user.

In an embodiment, as shown in FIG. 2 and FIG. 3, the processor of the host may send the rendered audio stream (Multiple audio streams) for the next rendering moment obtained by audio rendering to the head-mounted display device through the 802.11ad router.

According to the embodiment of the present disclosure, the time warped frame and the rendered audio stream for the next rendering moment are obtained at the current rendering moment by tracking and predicting the user head motion at the next rendering moment, such that the audio and video at the next rendering moment are processed in advance at the current rendering moment, content transmitted at the current moment includes the audio and video content corresponding to the user's action at the next moment, which can effectively reduce the delay between the sense of motion by the eyes and the perception of motion by the brain, thereby effectively reducing dizziness.

Figure 5:
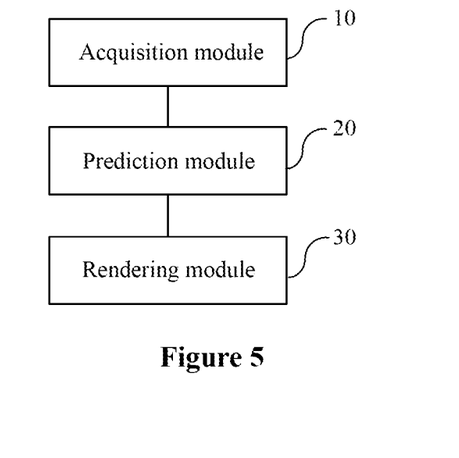
FIG. 5 is a structural block diagram of a data acquisition apparatus for a head-mounted display device according to an embodiment of the present disclosure.

Reference is made to FIG. 5, which is a structural block diagram of a data acquisition apparatus for a head-mounted display device according to an embodiment of the present disclosure. The apparatus may include an acquisition module 10, a prediction module 20 and a rendering module 30.

The acquisition module 10 is configured to acquire user head posture information collected by a head posture sensor, where the head posture sensor is arranged in the head-mounted display device.

The prediction module 20 is configured to determine a predicted head position at a next rendering moment based on the user head posture information and a current display scene of the head-mounted display device, where the current display scene is a scene displayed by the head-mounted display device at a current rendering moment.

The rendering module 30 is configured to acquire a current video rendering corresponding to the current rendering moment based on the predicted head position and video data at the current rendering moment, in order that the head-mounted display device displays a rendered video at the current rendering moment and a target time warped frame, where the current video rendering includes the rendered video and one or more time warped frames for the next rendering moment, and the target time warped frame is one of the one or more time warped frames.

In an embodiment, the prediction module 20 may include a first prediction sub-module.

The first prediction sub-module is configured to determine the predicted head position based on a current user head posture and the current display scene, where the current user head posture is user head posture information at the current rendering moment in the user head posture information.

In an embodiment, the prediction module 20 may include a second prediction sub-module.

The second prediction sub-module is configured to determine the predicted head position based on a target user head posture and the current display scene, where the target user head posture is user head posture information from a target rendering moment to the current rendering moment in the user head posture information, and the target rendering moment is a predetermined moment prior to the current rendering moment.

In an embodiment, the apparatus may further include a video sending module.

The video sending module is configured to send the current video rendering to the head-mounted display device.

In an embodiment, the apparatus may further include an audio rendering module.

The audio rendering module is configured to generate a rendered audio stream for the next rendering moment corresponding to each of the predicted head position, in order that the head-mounted display device plays a target rendered audio stream in the rendered audio stream.

According to the embodiment of the present disclosure, the time warped frame for the next rendering moment may be obtained at the current rendering moment by tracking and predicting the user head motion at the next rendering moment through the prediction module 20, in order that the video data of the current head-mounted display device can include the time warped frame from the current rendering moment to the next rendering moment, thereby reducing the delay of the display screen perceived by the user of the head-mounted display device, effectively reducing dizziness of the user, and improving the user experience.

A host is further provided according to an embodiment of the present disclosure. The host includes: a memory configured to store computer programs; and a processor configured to: when executing the computer programs, implement the steps of the data acquisition method for a head-mounted display device according to any one of the foregoing embodiments.

A computer-readable storage medium having computer programs stored thereon is further provided according to an embodiment of the present disclosure. The computer programs, when being executed, may implement the steps of the data acquisition method for a head-mounted display device applied to a host according to any one of the foregoing embodiments. The storage medium may include: a USB flash disk, a mobile hard disk, a read-only memory (ROM), a random access memory (RAM), a magnetic disk, an optical disk, or other media capable of storing program codes.

Figure 6:
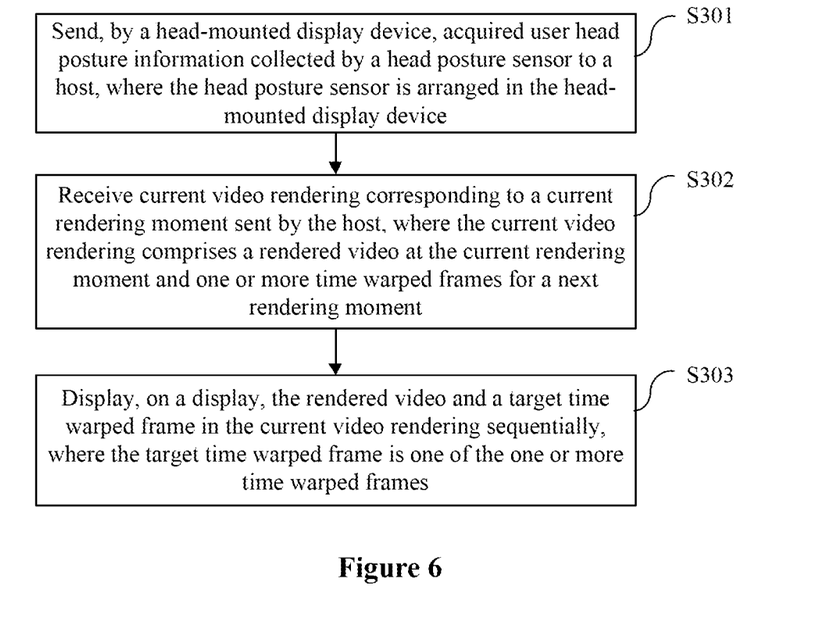
FIG. 6 is a flowchart of a data acquisition method for a head-mounted display device applied to a head-mounted display device according to an embodiment of the present disclosure.

Reference is made to FIG. 6, which is a flowchart of a data acquisition method for a head-mounted display device applied to a head-mounted display device according to an embodiment of the present disclosure. The method may include following steps 301 to 303.

In step 301, the head-mounted display device sends acquired user head posture information collected by a head posture sensor to a host, where the head posture sensor is arranged in the head-mounted display device.

In step 302, current video rendering corresponding to a current rendering moment sent by the host is received, where the current video rendering includes a rendered video at the current rendering moment and one or more time warped frames for a next rendering moment.

It should be understood that the step 301 and the step 302 in this embodiment correspond to the data acquisition method for a head-mounted display device applied to the host according to the above embodiment, and details are not described herein.

In step 303, the rendered video and a target time warped frame in the current video rendering are sequentially displayed on a display, where the target time warped frame is one of the one or more time warped frames.

In an embodiment, in this step, after acquiring the current video rendering corresponding to the current rendering moment sent by the host, the processor of the head-mounted display device may determine the target time warped frame among the time warped frames at the next rendering moment in the current video rendering, and after displaying the rendered video at the current rendering moment on its own display, the processor first displays the target time warped frame, and then displays a rendered video at the next rendering moment obtained afterward, so as to avoid the problem of long display delay between the rendered video at the current rendering moment and the rendered video at the next rendering moment, thereby effectively reducing dizziness of the user.

That is, this step may include the step of determining, by the processor, the target time warped frame in the current video rendering. For example, in a case that the current video rendering includes only one time warped frame for the next rendering moment, the time warped frame may be directly used as the target time warped frame. In a case that the current video rendering includes more than one time warped frames for the next rendering moment, the processor may select one of the time warped frames for the next rendering moment as the target time warped frame, based on the user head posture information at the current moment. That is, since the current moment at which the processor determines the target time warped frame is certainly subsequent to the current rendering moment, the processor of the head-mounted display device may determine, based on the user head posture information at the current moment, one of the time warped frames for the next rendering moment having a corresponding predicted head position that is closest to the current user head position indicated by the user head posture information at the current moment, so as to select the target time warped frame.

For example, in a case that the quantity of the time warped frames for the next rendering moment in the current video rendering is greater than one, the processor of the head-mounted display device may determine a current user head position based on the user head posture information at the current moment collected by the head posture sensor, when displaying the rendered video on the display; and select, based on a predicted head position corresponding to each of the time warped frames, one of the time warped frames having a corresponding predicted head position that is closest to the current user head position as the target time warped frame, and display the target time warped frame after the displaying of the rendered video is completed.

It should be understood that this embodiment may further include: receiving, by the head-mounted display device, a rendered audio stream for the next rendering moment sent by the host; and determining a target rendered audio stream in the rendered audio stream based on the user head posture information at the current moment collected by the head posture sensor, and playing the target rendered audio stream, to mitigate or eliminate the sound delay perceived by the user by playing the rendered audio stream for the next rendering moment. For example, in a case that the user wearing the head-mounted display device performs a rightward motion, the playback of the rendered audio stream for the next rendering moment can make the sound in the scene come from the left side.

In an embodiment, the manner in which the processor determines and plays the target rendered audio stream in the rendered audio stream based on the user head posture information at the current moment collected by the head posture sensor may be set by a designer. For example, in a case that the received rendered audio stream for the next rendering moment is a rendered audio stream corresponding to only one predicted head position, the processor may use the rendered audio stream as the target rendered audio stream. In a case that the received rendered audio stream at the next rendering moment is rendered audio streams corresponding to two or more predicted head positions, the processor uses a rendered audio stream corresponding to a predicted head position closest to the current user head position as the target rendered audio stream. The processor may also use the rendered audio stream corresponding to a predicted head position closest to the current user head position as the target rendered audio stream, in a case that there is a rendered audio stream for which a distance between a corresponding predicted head position and the current user head position is less than a threshold. In a case that there is no rendered audio stream for which a distance between a corresponding predicted head position and the current user head position is less than the threshold, rendered audio streams corresponding to two predicted head positions closest to the current user head position are used as the target rendered audio stream for mixed playback by using a speaker.

According to the embodiment of the present disclosure, a head-mounted display device displays the rendered video and the target time warped frame in the current video rendering sequentially on the display, so that the target time warped frame is displayed between the rendered video at the current rendering moment and the rendered video at the next rendering moment, which can effectively reduce the delay between the sense of motion by the eyes and the perception of motion by the brain, thereby effectively reducing dizziness.

Figure 7:
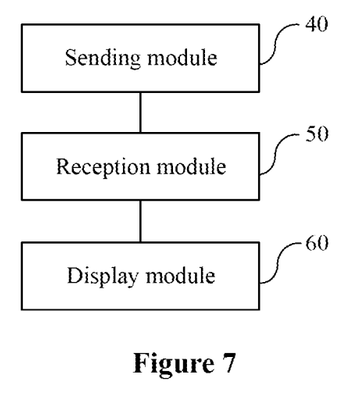
FIG. 7 is a structural block diagram of a data acquisition apparatus for a head-mounted display device applied to a head-mounted display device according to an embodiment of the present disclosure.

Reference is made to FIG. 7, which is a structural block diagram of a data acquisition apparatus for a head-mounted display device applied to a head-mounted display device according to an embodiment of the present disclosure. The apparatus may include a sending module 40, a reception module 50 and a display module 60.

The sending module 40 is configured to send acquired user head posture information collected by a head posture sensor to a host, where the head posture sensor is arranged in the head-mounted display device.

The reception module 50 is configured to receive current video rendering corresponding to a current rendering moment sent by the host, where the current video rendering includes a rendered video at the current rendering moment and one or more time warped frames for a next rendering moment.

The display module 60 is configured to display, on a display, the rendered video and a target time warped frame in the current video rendering sequentially, where the target time warped frame is one of the one or more time warped frames.

In an embodiment, in a case that a quantity of the one or more time warped frames is greater than 1, the display module 60 may include a determination sub-module and a selection and display sub-module.

The determination sub-module is configured to determine a current user head position based on user head posture information at a current moment collected by the head posture sensor, when the rendered video is being displayed on the display.

The selection and display sub-module is configured to: select, based on a predicted head position corresponding to each of the time warped frames, one of the time warped frames having a corresponding predicted head position that is closest to the current user head position as the target time warped frame, and display the target time warped frame after displaying of the rendered video is completed.

In an embodiment, the apparatus may further include an audio reception module and a playback module.

The audio reception module is configured to receive a rendered audio stream for the next rendering moment sent by the host.

The playback module is configured to determine a target rendered audio stream in the rendered audio stream based on user head posture information at a current moment collected by the head posture sensor, and play the target rendered audio stream.

According to the embodiment of the present disclosure, the display module 60 causes a head-mounted display device to display the rendered video and the target time warped frame in the current video rendering sequentially on the display, so that the target time warped frame is displayed between the rendered video at the current rendering moment and the rendered video at the next rendering moment, which can effectively reduce the delay between the sense of motion by the eyes and the perception of motion by the brain, thereby effectively reducing dizziness.

A head-mounted display device is further provided according to the present disclosure. The head-mounted display device includes: a memory configured to store computer programs; and a processor configured to: when executing the computer programs, implement the steps of the data acquisition method for a head-mounted display device applied to a head-mounted display device according to any of the foregoing embodiments.

A computer-readable storage medium having computer programs stored thereon is further provided according to an embodiment of the present disclosure. The computer programs, when being executed, may implement the steps of the data acquisition method for a head-mounted display device applied to a head-mounted display device according to any one of the foregoing embodiments. The storage medium may include: a USB flash disk, a mobile hard disk, a read-only memory (ROM), a random access memory (RAM), a magnetic disk, an optical disk, or other media capable of storing program codes.

The above embodiments in the specification are described in a parallel or progressive manner. Each embodiment focuses on describing its differences from other embodiments. Therefore, one embodiment can refer to other embodiments for the same or similar parts. Since the apparatus disclosed in the embodiment corresponds to the method disclosed in the embodiment, the description of the apparatus is relatively simple, and reference may be made to description of the method for relevant parts.

It is further understood by those skilled in the art that units and algorithm steps in the examples described in combination with the disclosed embodiments may be implemented by electronic hardware, computer software or a combination thereof. In order to clearly describe interchangeability of the hardware and the software, composition and steps of the various examples have been generally described in terms of function in the above description. Whether these functions are performed in hardware or software depends on the specific application and design constraints for the technical solution. Those skilled in the art may use different methods to implement the described functions for each particular application, and such implementation should not be regarded as going beyond the scope of the present disclosure.

Steps of the method or algorithm described in combination with the embodiments disclosed herein may be directly implemented by hardware, a software module executed by a processor, or a combination thereof. The software module may be stored in a Random Access Memory (RAM), a memory, a Read-Only Memory (ROM), an electrical programmable ROM, an electrically erasable programmable ROM, a register, a hardware disk, a removable magnetic disk, a CD-ROM, or any other forms of storage medium well known in the art.

It should be noted that, the relationship terms such as "first", "second" and the like are only used herein to distinguish one entity or an operation from another, rather than to necessitate or imply that an actual relationship or order exists between the entities or operations. Moreover, terms "comprising", "including", or any other variant thereof are intended to encompass a non-exclusive inclusion such that processes, methods, articles, or devices that include a series of elements include not only those elements but also those that are not explicitly listed or other elements that are inherent to such processes, methods, articles, or devices. Unless expressively limited otherwise, an element defined by a statement of "comprising (including) one . . . " does not exclude a case that other similar elements exist in the process, method, article or device including the element.

The invention claimed is:

1. A data acquisition method for a head-mounted display device, comprising:

acquiring user head posture information collected by a head posture sensor, wherein the head posture sensor is arranged in the head-mounted display device;

determining a predicted head position at a next rendering moment based on the user head posture information and a current display scene of the head-mounted display device, wherein the current display scene is a scene displayed by the head-mounted display device at a current rendering moment; and acquiring a current video rendering corresponding to the current rendering moment based on the predicted head position and video data at the current rendering moment, in order that the head-mounted display device displays a rendered video at the current rendering moment and a target time warped frame, wherein the current video rendering comprises the rendered video and one or more time warped frames for the next rendering moment, and the target time warped frame is one of the one or more time warped frames, wherein the determining a predicted head position at a next rendering moment based on the user head posture information and a current display scene of the head-mounted display device comprises:

determining the predicted head position based on a target user head posture and the current display scene, wherein the target user head posture is user head posture information from a target rendering moment to the current rendering moment in the user head posture information, and the target rendering moment is a predetermined moment prior to the current rendering moment.

2. The data acquisition method for a head-mounted display device according to claim 1, wherein the determining a predicted head position at a next rendering moment based on the user head posture information and a current display scene of the head-mounted display device further comprises:

determining the predicted head position based on a current user head posture and the current display scene, wherein the current user head posture is user head posture information at the current rendering moment in the user head posture information.

3. The data acquisition method for a head-mounted display device according to claim 1, wherein after acquiring current video rendering corresponding to the current rendering moment, the method further comprises:

sending, by a host, the current video rendering to the head-mounted display device.

4. The data acquisition method for a head-mounted display device according to claim 1, wherein after determining a predicted head position at a next rendering moment based on the user head posture information and a current display scene of the head-mounted display device, the method further comprises:

generating a rendered audio stream for the next rendering moment corresponding to each of the predicted head position, in order that the head-mounted display device plays a target rendered audio stream in the rendered audio stream.

5. A host, comprising:

a memory configured to store computer programs; and a processor, configured to: when executing the computer programs, implement steps of the data acquisition method for a head-mounted display device according to claim 1.

6. A non-transitory computer-readable storage medium having computer programs stored thereon, wherein the computer programs, when being executed, implements steps of the data acquisition method for a head-mounted display device according to claim 1.

7. A data acquisition method for a head-mounted display device, comprising:

sending, by the head-mounted display device, acquired user head posture information collected by a head posture sensor to a host, wherein the head posture sensor is arranged in the head-mounted display device;

receiving current video rendering corresponding to a current rendering moment sent by the host, wherein the current video rendering comprises a rendered video at the current rendering moment and one or more time warped frames for a next rendering moment; and displaying, on a display, the rendered video and a target time warped frame in the current video rendering sequentially, wherein the target time warped frame is one of the one or more time warped frames, wherein in a case that a quantity of the one or more time warped frames is greater than 1, the displaying, on a display, the rendered video and a target time warped frame in the current video rendering sequentially comprises:

determining a current user head position based on user head posture information at a current moment collected by the head posture sensor, when displaying the rendered video on the display; and selecting, based on a predicted head position corresponding to each of the time warped frames, one of the time warped frames having a corresponding predicted head position that is closest to the current user head position as the target time warped frame, and displaying the target time warped frame after displaying of the rendered video is completed.

8. The data acquisition method for a head-mounted display device according to claim 7, further comprising:

receiving a rendered audio stream for the next rendering moment sent by the host; and determining a target rendered audio stream in the rendered audio stream based on user head posture information at a current moment collected by the head posture sensor, and playing the target rendered audio stream.

9. A head-mounted display device, comprising:

a memory configured to store computer programs;

a processor, configured to: when executing the computer programs, implement the steps of the data acquisition method for a head-mounted display device according to claim 7.

10. A non-transitory computer-readable storage medium having computer programs stored thereon, wherein the computer programs, when being executed, implements steps of the data acquisition method for a head-mounted display device according to claim 7.

* * * * *